UNITED STATES PATENT OFFICE.

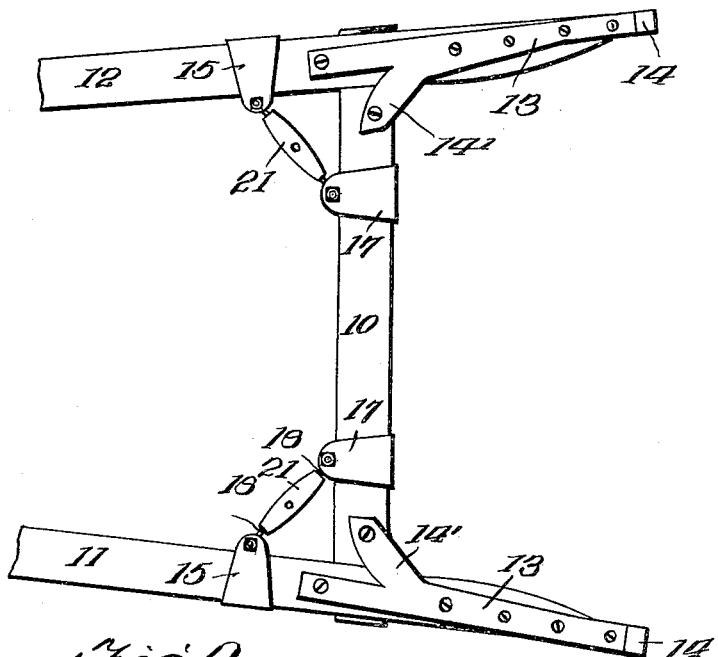

NEWTON W. McMILLAN, OF GUSTINE, TEXAS.

BUGGY-SHAFTS.

1,126,242.  Specification of Letters Patent.  Patented Jan. 26, 1915.

Application filed August 5, 1913. Serial No. 783,157.

*To all whom it may concern:*

Be it known that I, NEWTON W. McMIL-LAN, citizen of the United States, residing at Gustine, in the county of Comanche and State of Texas, have invented certain new and useful Improvements in Buggy-Shafts, of which the following is a specification.

This invention relates to an improvement in vehicle shafts.

The primary object of the invention is to provide a construction whereby the shafts and cross beam which connect the same may be held against relative movement.

A further object of the invention is to provide means whereby the shafts may be adjusted with respect to each other and to the connecting cross beam.

A still further object of the invention is to provide a structure in which the adjustment of the shafts with respect to the cross beam may be effected without removing the shafts from the vehicle.

For a full understanding of the invention, reference is to be had to the following description and accompanying drawing, wherein:

Figure 1 is a view showing the adjusting mechanism supported on the shafts; Fig. 2 is a sectional view showing the arrangement of the adjusting mechanism; and Fig. 3 is a disassembled perspective view of said mechanism.

Corresponding and like parts are referred to in the following description and indicated in all the views of the accompanying drawing by the same reference characters.

In the drawings, 10 designates the cross brace which is connected to the shafts 11 and 12 in the usual manner. Straps 13 are connected to each of the shafts adjacent their terminals, the straps at the terminals of the shafts being bent as at 14 to engage the thill couplings of the vehicle. The terminals of the straps remote from the ends of the shafts extend entirely across that portion of the shafts through which the cross beam 10 extends, each of the straps being formed with an extension 14' which is bolted or otherwise secured to the cross beam. Thus the shafts and cross beam are effectually held together, the connecting means also providing means for attaching the shafts to the thill couplings. In devices of this character, it has been found that the shafts have a tendency to move with respect to each other, and that after continued use the same will work loose from the cross beam 10. To prevent this movement, and to provide means for effectually taking up any movement between the shafts and the beam 10, each of the shafts is provided with a clip 15 which embraces the same adjacent the cross beam 10, the clips being formed with apertured ears 16. A similar clip 17 is arranged adjacent each end of the cross beam 10, said clips embracing the cross beam and having their apertured ears disposed on that side of the cross beam adjacent the apertured ears of the clips 15. A threaded bolt 18 is supported by each of the clips, the bolt being formed with an extension 19 disposed at right angles to its body portion, the extension passing through the apertured ears of the clips and receiving a nut 20 which, when tightened, securely clamps the clip on the member which it embraces, and, at the same time, prevents displacement of the bolt.

In adjustably connecting the bolt members 18, the present invention employs a turn-buckle 21. This turn-buckle 21 is formed in the nature of a sleeve having a longitudinally extending threaded bore. The thread of this bore is clockwise from the center to one terminal and counter-clockwise from the center to the other terminal, thus making it possible to draw the two clips 15 and 17 toward one another by merely rotating the turn-buckle 21 in the usual manner. By this construction, it will be noted that should the shafts work loose, the adjusting of the turn-buckle will effectually tighten them, maintaining the shafts and cross beam rigidly connected. Thus the shafts and beam may not only be adjusted, but the same, when assembled, may be tightened in a simple and convenient manner.

The many advantages of a construction of this character will be clearly apparent as it will be noted that it may be easily and economically manufactured, and that the various parts may be readily assembled. Attention is directed to the fact that but a single bolt is employed in securing each of the extensions 14' to the cross beam 10. Thus the shaft and cross beam are not materially weakened, the clip embracing the same beyond the bolts, and clamping them together at points where they are not weakened by bolt holes. It will also be noted that the strap is not welded at any point throughout its entire length.

What I claim is:—

A shaft construction including a cross beam to which the shafts are connected, clips embracing the cross beam, clips embracing the shafts, each of said clips consisting of a metallic band having registering apertures formed at its terminals, an L-shaped bolt for each of said clips, the vertical leg of the bolt being inserted through the apertures of the band, a nut threaded onto the vertical leg for drawing the band into clamping engagement with the shafts or cross beam to which it is attached, and turn-buckles for adjustably connecting the horizontal legs of the L-shaped bolts of a shaft clip and a cross beam clip.

In testimony whereof I affix my signature in presence of two witnesses.

<div style="text-align:center">
his<br>
NEWTON W. × McMILLAN. [L. S.]<br>
mark
</div>

Witnesses:
G. A. CUNNINGHAM,
J. E. MILLER.

Copies of this patent may be obtained for five cents each, by addressing the "Commissioner of Patents, Washington, D. C."